United States Patent [19]

Mauri et al.

[11] Patent Number: 4,536,453

[45] Date of Patent: Aug. 20, 1985

[54] COATED POLYOLEFINIC FILMS HAVING LOW ADHESION TO THE WELDING BARS

[75] Inventors: Luigi Mauri; Rino Cardaio, both of Terni, Italy

[73] Assignee: Moplefan S.p.A., Milan, Italy

[21] Appl. No.: 488,591

[22] Filed: Apr. 25, 1983

[30] Foreign Application Priority Data

Apr. 26, 1982 [IT] Italy ................................ 20935 A/82

[51] Int. Cl.$^3$ ............................ B32B 5/16; B32B 27/08
[52] U.S. Cl. ..................................... 428/484; 428/516; 428/520; 428/522; 428/35; 428/910; 206/259; 426/127; 229/68 R; 427/322; 427/223; 427/416
[58] Field of Search ............... 428/516, 522, 520, 484

[56] References Cited

U.S. PATENT DOCUMENTS

| | | | |
|---|---|---|---|
| 3,692,568 | 9/1972 | Clark | 428/484 |
| 3,753,769 | 8/1973 | Steiner | 428/484 X |
| 4,058,645 | 11/1977 | Steiner | 428/520 X |
| 4,058,649 | 11/1977 | Steiner | 428/520 X |
| 4,348,457 | 9/1982 | Rosenthal et al. | 428/520 X |

*Primary Examiner*—Patricia C. Ives

[57] ABSTRACT

Films comprising alpha-olefin polymers, such as polypropylene consisting essentially of recurring propylene units and having a substantial crystalline polypropylene content, and in particular isotactic polypropylene, are rendered poorly adhesive to the welding bars of automatic and semi-automatic machines conventionally used for the manufacture of containers, envelopes, bags, vessels and, in general, other manufactured articles useful in the packaging industry, by coating the films by a mixture of a copolymer of a vinyl ester with an unsaturated acid, a terpolymer of an alkyl acrylate, an alkylmethacrylate and an unsaturated acid and a cross-linking amine.

9 Claims, No Drawings

COATED POLYOLEFINIC FILMS HAVING LOW ADHESION TO THE WELDING BARS

BACKGROUND OF THE INVENTION

1. Field of the Invention

The present invention relates to coated films comprising alpha-olefin polymers, such as polypropylene consisting essentially of recurring propylene units and having a substantial crystalline polypropylene content, and in particular isotactic polypropylene, which are easily thermoweldable and which have an improved resistance to sticking against the welding bars of automatic and semi-automatic machines conventionally used for the manufacture of containers, envelopes, bags, vessel and, in general, other manufactured articles useful in the packaging industry.

2. The Prior Art

Patents assigned to Montedison S.p.A. describe methods for preparing films of the alpha-olefin polymers made of macromolecules having, prevailingly, stereoregular structure, isotactic, and, in particular, of polypropylene substantially consisting of macromolecules of isotactic structure and obtained by polymerizing propylene in the presence of stereospecific catalysts.

Because of their mechanical, protective and optical properties, films obtained from crystalline polyolefins, in particular polypropylene, are materials the widest field of application of which is in the packaging industry.

One difficulty encountered in adapting such films for use in the packaging art is that these films made of polyolefins, and in particular of polypropylene, cannot be processed or transformed using conventionally available automatic and semi-automatic machines. This is due to the fact that the automatic and semi-automatic machines have been designed and built keeping in mind the characteristics of the packaging material most widely used up to now, that is, the cellophane film which, as is quite known, is insensitive to heat until reaching its inflammable temperature.

The use of polyolefinic and in particular of polypropylene films on automatic and semi-automatic thermowelding devices mounted on the standard packaging machines, involves a considerable reduction of the productivity due to the melting of the film in the points of contact with the welding elements, or to the sticking to these latter or to ruptures, making it practically impossible to maintain a commercially reasonable operating speed of the machine.

It is known to improve the thermoweldability characteristics of the synthetic polymer films, by coating the film with materials capable of imparting said characteristics to the films.

In general, the known methods involve coating the supporting film by extruding a welding layer on the supporting film, in the molten state, (extrusion coating). Still another method is the so-called "lamination" of two films against each other, with or without the interposition of adhesives. A further method consists in spreading a solution of the coating agent in a suitable solvent, on the supporting film. The coating agent may be coupled to an anchoring agent (primer) which facilitates the adhesion of the coating to the supporting film.

Often the primer is substituted by, or used with, a pre-treatment of the supporting film with chemical agents, electrical non-piercing discharges, a flame, or other suitable pre-treatment.

As materials suitable for the coating of polyolefinic films there have been described and suggested numerous compounds, prevailingly polymeric compounds, which, in general, are applied in the form of solutions in an organic solvent. The use of organic solvents, which successively are removed from the coated film by evaporation, makes necessary the installation of suitable equipment for the recovery of the solvents and of devices that will keep the work places free of vapors.

Moreover, the use of organic solvents involves suitable preventive measures against pollution of the environmental atmosphere and of the liquid discharged effluents.

There have also been suggested polymeric coating materials applicable to the films in the form of aqueous dispersions.

Thus, for instance, U.S. Pat. No. 3,753,769 discloses the use of an acrylic interpolymer, as coating material, applicable by an aqueous alkaline solution, such as for instance by an ammonia solution.

The interpolymer disclosed in this U.S. Pat. No. 3,753,769 consists essentially of: (a) from about 2 to about 15 parts by weight of an alpha-beta-monoethylenically unsaturated carboxylic acid, such as acrylic acid, methacrylic acid, maleic acid, crotonic acid etc., and (b) from about 85 to about 98 parts by weight of neutral monomer esters, preferably comprising (i) an alkylacrylate such as methyl-, ethyl-, or butyl-acrylate and (ii) an alkyl methacrylate such as methyl-methacrylate or an ethyl-methacrylate. The monomer componenets are employed in a ratio such that the alkylmethacrylate monomer is present in an amount of at least 10% by weight, and preferably from about 20 to about 80% by weight, with respect to the total terpolymer composition, and the alkylacrylate monomer component in amounts of at least 10% by weight, and preferably from about 80 to about 20% by weight, of the total terpolymer composition.

The possibility to add the coating compositions onto the polyolefin films from aqueous solutions or dispersions allows to achieve a substantial saving on the process because it does not require the use of expensive devices for the recovery of the solvents and for the solution of environmental hygene and pollution problems, and, also, it makes the process less complex.

However, the films coated with the above disclosed interpolymers show excellent values of weld resistance, but have a poor and unsatisfactory sticking resistance to the welding bars.

THE PRESENT INVENTION

Object of this invention is to provide a coating agent for polyolefinic films which may be applied from aqueous solutions or dispersions and confers on the coated film an excellent resistance to sticking to the welding bars.

It has now been found that a coating agent having the above requisites is that consisting of: p1 (a) from about 50% to about 90% by weight of a copolymer consisting of 95–85% by weight of a vinyl ester and of 5–15% by weight of an unsaturated acid;
  (b) from about 49.5% to about 9.5% by weight of a terpolymer consisting of from 25% to 40% by weight of at least one alkyl acrylate, from 70% to 40% by weight of at least one alkyl methacrylate and from 5% to 20% by weight of an unsaturated acid; and (c) from about 0.5% to about 1.5% by weight of an amine having a cross-linking action.

The present invention provides, also, polyolefinic films coated either on one or on both sides or surfaces with a coating agent having the above indicated composition.

Before applying the coating agent onto the substrate, the substrate's surface is subjected to a pre-treatment to promote a good and steady adhesion of the coating agent to the film in order to avoid the "peeling" effect. This treatment may be carried out according to known techniques such as for instance by electrical discharges, by flame or by chemical oxidation.

The coating agent may be applied on biaxially-stretched film, on unstretched film or on a film stretched in one direction.

When a stronger adherence of the coating to the film is desired, with respect to that obtainable through the surface pre-treatment of the film with one of the above cited methods, an intermediate coating of a primer is used. This primer coating increases the adherence of the coating composition to the film surface. In this case, the film is first treated with one of the above reported pre-treatments, the electronic treatment being the preferred one, and subsequently a continuous coating of primer is applied to the surface of the pre-treated film.

The primer is well known to the skilled in the art and, preferably, consists of polymers of alkylene-imines such as polyethylene imine.

The primer is applied onto the pre-treated basic film, in the form of a solution by means of conventional coating methods, such as for instance using a standard spreading machine for thin sheets.

The coating is applied by conventional methods, using alkaline, aqueous solutions or dispersions, particularly ammoniacal solutions, of the coating agents. Conventional coating methods, such as, more particularly, buttering, dipping, spraying or the like may be used.

The excess of solution or dispersion may be eliminated by wringing between rollers or with the rotogravure or reverser system with metering or dosing bar.

The total thickness of the coating may vary from 1 to 20 microns. In general, the thickness of the applied coating is such as to be sufficient for imparting to the coated film the desired properties of resistance to the thermal welding and to the sticking to the welding bars.

Suitable copolymers, consisting of a vinyl ester and of an unsaturated acid, which may be employed as a coating agent component, include the copolymers of vinyl-acetate, vinyl-stearate and the like with an unsaturated acid such as acrylic acid, methacrylic acid, maleic acid, fumaric acid, crotonic acid and the likes. The relative proportion of the monomers that may be used for producing the above copolymers, may vary and in general is comprised between 95% and 85%, and preferably is 90% by weight, of a vinyl ester, and correspondingly from 5% to 15%, but preferably 10% by weight of an unsaturated acid.

The alkyl acrylates and methacrylates used for the production of the terpolymer generally have a low number of carbon atoms, particularly not exceeding 4. Methyl-acrylate, ethyl-acrylate, methyl-methacrylate and ethyl-methacrylate are preferred. The unsaturated acid used for preparing said terpolymers in general is selected from acrylic acid, methacrylic acid, maleic acid, and crotonic acid.

The amine, having a cross-linking action and which is mixed together with the copolymer and with the terpolymer for forming the coating agent of the present invention, is a poly-alkylene-imine whose alkylene radical contains from 1 to 4 carbon atoms; the poly(ethylene-imine) is preferred.

In order to prevent the tendency of the film to adhere to itself when two or more surfaces of the film are held pressed together, such as for instance in the case of reels of sheets or when sheets of the film are stacked in storage, it is a common technique to use anti-adhesive materials, generally known as "anti-blocking agents". Anti-blocking agents which may be used include waxes and wax-like materials which melt at temperatures above the maximum temperatures encountered in the storage of the film and which are not soluble in the coating agent at these temperatures.

Specific examples are the natural waxes, such as paraffin wax, microcrystalline wax, bees wax, carnauba wax, Japan wax, montan wax, etc., as well as synthetic waxes such as hydrogenated castor oil, chlorinated hydrocarbon waxes, long-chain fatty acid amides, etc.

In a presently preferred embodiment, the polyolefin film which may advantageously be coated with the coating composition of the present invention is obtained from polypropylene essentially consisting of isotactic macromolecules and obtained by polymerizing propylene in the presence of stereospecific catalysts. Various adjuvants may be added to the polymer before it is formed into a film, such as stabilizers, lubricants, dyeing pigments, antistatic agents, fillers, plasticizers and the like.

After the extrusion, the basic film of polypropylene is heated and oriented by stretching in one or both directions, following the conventional extrusion and stretching processes. The film is then subjected to the surface treatments, as hereinabove described, and it is coated with the coating composition of the present invention.

For the evaluation of the coated films of the present invention, the following characteristics have been measured.

The degree of adhesion of the coating to the supporting film is measured by pressing a piece of a self-adhesive cellulose tape against the surface of the coated film, and then abruptly stripping said tape off the surface. The coatings with a good adhesion will remain firmly attached to the supporting film. On the contrary, the coatings with a poor or bad adhesion will be partially or completely stripped off from the supporting film.

The tensile stress resistance of the weld is measured with the "peeling test" method by means of a dynamometer. The "peeling test" values are considered "good" when they exceed 80–100 g/cm. However, the welding resistance values must be referred to the type of application for which the coated film is intended. Thus, 80–100 g/cm should be considered an excellent value when the application relates to, for instance, the weld of the coated film intended for the wrapping of cigarettes. Quite different would be the case of the application of the coated film to the manufacture of container bags for rice, sugar, and the like, for which much higher weld resistance values are required.

The measure of the sticking of the coated film to the welding elements is determined by measuring, with an Instron dynamometer, the force required, per surface unit (g/sq.cm), for detaching (removing) from the welding elements a test piece connected to the dynamometer and subjected to welding, under operational conditions similar to those usually applied on standard packaging machines (temperature=130° C., pressure=40 psi, weld time=1 second).

The blocking is measured at 43° C., according to ASTM A-1146-53.

The slipping (slippage) is measured by the static friction coefficient T.M.I.

The following examples are given to illustrate the invention in more detail but are not intended to be limiting since changes and variations can be made in the practice of the present invention without departing from the spirit and scope thereof.

EXAMPLE 1

A polypropylene film obtained by extrusion of a propylene polymer consisting prevailingly of macromolecules having isotactic structure, stretched and with a thickness of 25 microns, was subjected to an electronic treatment with a SCAE-type device. The film was then coated on one side with a 1% polyethyleneimine aqueous solution as a "primer", by means of a conventional spreading machine for thin sheets.

The film was then dried in an oven and coated with a second layer consisting of a mixture of:
(a) vinylacetate/crotonic acid copolymer (90-100) having a viscosity=20 cps (20% solution in ethylacetate at 20° C.): 76 p.b.w.
(b) ethylacrylate/methylmethacrylate/ethyl-methacrylate/methacrylic acid (30-35-25-10), terpolymer having an acidity number of 10 and a viscosity of 50 cps (a 30% ethylacetate solution at 20° C.): 18 p.b.w.
(c) Carnauba wax, in an aqueous dispersion: 5 p.b.w.
(d) Polyethyleneimine: 1 p.b.w.

The above mixture was applied as an 18% by weight aqueous dispersion.

After spreading, the coated film was dried at 90° C. The coated film showed the following characteristics:
coating thickness: 1.5 micron
adhesion: good
blocking: good
transparency: good
slippiness: good
weld resistance: 280 g/cm
welding temperature: 130° C.
sticking to the welding bars: 50 g/cm$^2$

EXAMPLE 2

The stretched polypropylene film of example 1, subjected to electronic treatment with a SCAE type device, covered with polyethyleneimine and then dried in an oven, was coated with a second layer consisting of:
(a) A vinylacetate/acrylic acid (90-10) copolymer having a viscosity of 22 cps (measured in a 20% ethylacetate solution at 20° C.): 71 p.b.w.
(b) Ethylacrylate/methylmethacrylate/ethylmethacrylate/methacrylic acid (30-35-25-10) terpolymer, having an acidity number of 10 and a viscosity of 50 cps (measured in a 30% ethylacetate solution at 20° C.): 23 p.b.w.
(c) Carnauba wax, in an aqueous dispersion: 5 p.b.w.
(d) Polyethyleneimine: 1 p.b.w.

The mixture was applied as a 20% by weight aqueous dispersion. After spreading, the coated film was dried at 90° C. The coated film showed the following characteristics:
coating thickness: 1.5 micron
adhesion: good
blocking: good
transparency: good
slippiness: good
weld resistance: 260 g/cm
welding temperature: 130° C.
sticking to the welding bars: 55 g/sq.cm EXAMPLE 3 (for comparison)

Example 1 was repeated by substituting the second layer with a coating consisting of a vinyl-acetate/crotonic acid copolymer (90/10) having a viscosity of 20 cps, measured in a 20% ethyl-acetate solution at 20° C. The coated film so obtained showed the following characteristics:
coating thickness: 1.5 micron
adhesion: good
blocking: poor
transparency: good
slippiness: poor
weld resistance: 300 g/cm
welding temperature: 130° C.
sticking to the welding bars: 320 g/sq.cm EXAMPLE 4 (for comparison)

Example 1 was repeated by substituting the second layer with a coating consisting of an ethyl-acrylate/methylacrylate/ethylmethacrylate/methacrylic acid terpolymer (30-35-25-10) having an acidity number equal to 10 and a viscosity of 50 cps, measured in a 30% ethylacetate solution at 20° C.

The coated film thus obtained, showed the following characteristics:
coating thickness: 1.5 micron
adhesion: good
blocking: poor
transparency: good
slippiness: poor
weld resistance: 280 g/sq.cm
welding temperature: 130° C.
sticking to the welding bars: 480 g/sq.cm

What we claim is:

1. A polyolefinic film having low adhesion to welding bars, coated on one or both sides with a coating agent consisting of a mixture of:
   from 50% to 90% by weight of a copolymer consisting of from 95% to 85% by weight of a vinyl ester and of from 5% to 15% by weight of an unsaturated acid;
   from 49.5% to 9.5% by weight of a terpolymer consisting of from 25% to 40% by weight of at least one alkyl-acrylate, from 70% to 40% be weight of at least one alkyl-methacrylate and from 5% to 20% by weight of an unsaturated acid; and
   from 0.5% to 1.5% by weight of a $C_1$-$C_4$ polyalkylene-imine having a cross-linking action.

2. A polyolefinic film according to claim 1, wherein the copolymer consists of 90% by weight of a vinyl ester and of 10% by weight of an unsaturated acid.

3. A polyolefinic film according to claim 1 wherein the copolymer is selected from the group consisting of copolymers of vinyl-acetate and vinyl-stearate with acrylic acid, methacrylic acid, maleic acid, fumaric and crotonic acid.

4. A polyolefinic film according to claim 1, wherein the terpolymer consists of at least an alkyl-acrylate having not more than 4 carbon atoms, of at least one alkyl-methacrylate having not more than 4 carbon atoms, and an unsaturated acid.

5. A polyolefinic film according to claim 4, wherein the alkyl-acrylate is selected from the group consisting of methyl-acrylate and ethyl-acrylate.

6. A polyolefinic film according to claim 4, wherein the alkyl-methacrylate is selected from the group consisting of methyl-methacrylate and ethyl-methacrylate.

7. A polyolefinic film according to claim 4, wherein the unsaturated acid is selected from the group consisting of acrylic acid, methacrylic acid, maleic acid and crotonic acid.

8. A polyolefinic film according to claim 1, wherein the poly-alkylene-imine is a poly-ethylene-imine.

9. A polyolefinic film according to claim 1, wherein the polyolefin is polypropylene consisting essentially of isotactic macromolecules, obtained by polymerization of propylene in the presence of stereospecific catalysts.

* * * * *